United States Patent [19]

Takaoka et al.

[11] 4,454,375
[45] Jun. 12, 1984

[54] POWER CABLE JOINT STRUCTURE HAVING SHEATH ISOLATION MEMBER CONTAINING ELECTRODE SPHERES

[75] Inventors: Michio Takaoka, Chiba; Motoyuki Ono, Sakura; Isao Kaji, Ichikawa, all of Japan

[73] Assignee: The Fujikura Cable Works, Limited, Tokyo, Japan

[21] Appl. No.: 416,304

[22] Filed: Sep. 9, 1982

[30] Foreign Application Priority Data

Mar. 27, 1982 [JP] Japan ............................ 57-49636

[51] Int. Cl.³ .................. H02G 15/08; H02G 15/188
[52] U.S. Cl. ............................... 174/73 R; 174/85
[58] Field of Search ............ 174/73 R, 73 SC, 84 R, 174/85, 88 C

[56] References Cited

FOREIGN PATENT DOCUMENTS

| 22660 | 1/1981 | European Pat. Off. .......... 174/84 R |
| 53-33748 | 9/1978 | Japan .................................. 174/85 |
| 53-52629 | 12/1978 | Japan .............................. 174/73 R |
| 54-139091 | 10/1979 | Japan .............................. 174/73 R |

*Primary Examiner*—Laramie E. Askin
*Attorney, Agent, or Firm*—Frishauf, Holtz, Goodman & Woodward

[57] ABSTRACT

A power cable joint structure in which a sheath isolation is provided in a cable shielding layer in, for instance, each phase of a three-phase circuit. A reinforcing insulation is covered on the connected cable conductors and a shielding layer is covered on the outer periphery of the above-mentioned joint itself. The shielding layer has a pair of mutually opposite layers with a gap therebetween which provides a sheath isolation. A thick sheet-like insulator 12 with a plurality of spherical electrodes distributed therein is contained in the sheath isolation.

10 Claims, 3 Drawing Figures

POWER CABLE JOINT STRUCTURE HAVING SHEATH ISOLATION MEMBER CONTAINING ELECTRODE SPHERES

BACKGROUND OF THE INVENTION

This invention relates to power cable joint structures and more particularly to a power cable joint structure including an improved sheath isolation of a cable shielding layer.

In order to decrease the sheath loss caused in the cable shielding layer or a metal sheath of an electric cable, a cross-bonding method is used in a conventional system and an electrical separation portion is formed in the shielding layer in, for instance, each phase of a three-phase circuit. It is necessary that the sheath isolation be designed to withstand not only abnormal surge voltages, but also the induced voltages between the cable conductor and the cable shielding layer. A sheath isolation is formed in an EHV CV cable by winding thin XLPE tapes, the same material as the cable isolation, on the joint, and then by molding the wound tapes to tight insulation.

Since, however, the thin insulating tape is wound in several turns, a disadvantage is incurred in that the longer on-site work is required. Moreover, it is difficult to maintain a uniform thickness of the insulator of the sheath isolation over the entire outer periphery of the cable insulation. The quality of on-site work therefore depends more upon the skill of the field workers.

SUMMARY OF THE INVENTION

It is accordingly an object of this invention to provide a power cable joint structure which can be formed with reduced field work. It is another object of this invention to provide a power cable joint structure which has a stable enough electrical characteristic to withstand either normally occurring induced voltages or abnormally occurring induced voltages.

In order to achieve the above-mentioned object, there is provided a power cable joint structure comprising cable conductor means, cable insulation means covered on the cable conductor means, cable shielding layer means covered above the cable conductor means with the cable insulation means and having a pair of electrodes located opposite to each other with a gap therebetween, and a sheath isolation filling the gap between the pair of electrodes which is made of an insulative material with a plurality of electrode spheres distributed therein.

In the power cable joint structure of this invention, the sheath isolation which is located in the gap mentioned above is formed by one wind of a thick sheet-like insulator with the electrode spheres distributed therein, reducing the amount of field work required as compared with the field work necessary for the conventional sheath isolation where several windings of a thin insulating tape in several turns is used.

Since static capacitances are distributed between the electrode spheres which are distributed in the insulator in the electrical separation portion, an electric field stress in the vicinity of the pair of electrode portions on the cable shielding layer is alleviated, thus providing the power cable joint structure with a stable enough electrical characteristic to withstand either normally occurring induced voltages or abnormally occurring surge voltages.

DETAILED DESCRIPTION OF THE PREFERRED EMBODIMENT

Figure 1:
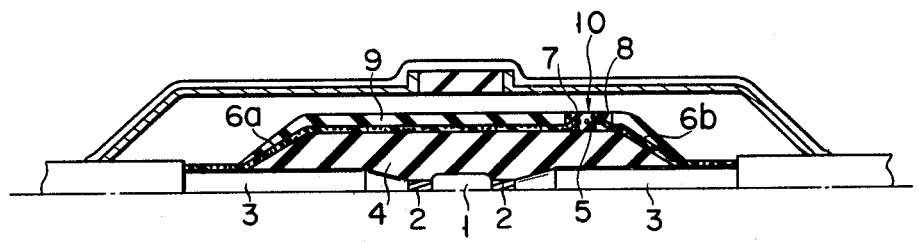
FIG. 1 shows a power cable joint structure according to the embodiment of this invention, the major intermediate section thereof including an electrical separation portion being shown in cross section with one of three phases of a three-phase circuit shown as a representative example.

One embodiment of this invention will be explained below by referring to the drawing.

Figure 2:
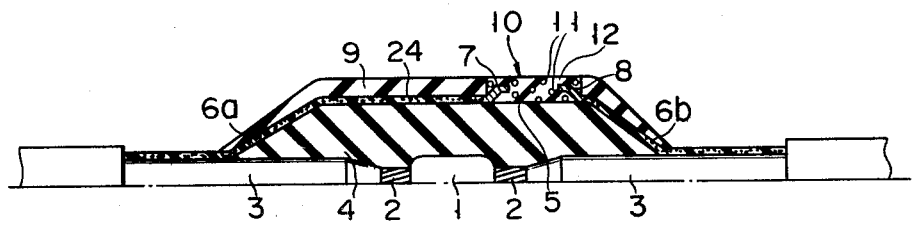
FIG. 2 is an enlarged cross-sectional view showing the major portion of the electrical separation portion of FIG. 1.
Figure 3:
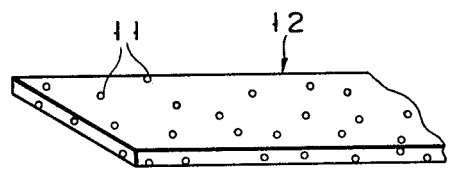
FIG. 3 is a perspective view showing a part of a thick sheet-like insulator as used in forming the electrical separation portion of FIG. 2.

As shown in FIG. 1, cable insulations 3,3 cover the conductors 2,2 which are connected to each other by a sleeve 1. A reinforcing insulation 4 covers on the outer periphery of the cable insulations 3,3, the outer periphery of the sleeve 1 and the exposed portions of the conductors 2,2. On the outer periphery of the reinforcing insulation 4 are disposed cable shielding layers 6a,6b with a gap 5 located therebetween. The ends of the cable shielding layers 6a,6b are located in opposition to each other with the gap 5 therebetween and include the electrodes 7,8, respectively, which are located substantially in the middle position as viewed from a direction of the thickness of the gap 5. An insulating layer 9 covers the outer periphery of the cable shielding layers 6a,6b. The electrodes 7,8 are embedded in an insulator to provide a sheath isolation 10. FIG. 2 is an enlarged view showing the sheath isolation. In FIG. 2, like reference numerals are employed to designate like part or elements except for the sheath isolation 10. The sheath isolation 10 is made up of a thick sheet-like insulator 12 with a plurality of electrode sperees 11 distributed therein. The insulator 12 is a thick sheet, as shown in FIG. 3, made of, for example, ethylene propylene rubber or cross-linked polyethylene. A plurality of electrode spheres 11 are embedded in the insulator 12. A conductive or semiconductive sphere is used as the electrode sphere 11. The conductive sphere may be made of steel, iron, copper, aluminium etc. and the semiconductive sphere may be made of a semiconductive plastic sphere with a conductive sphere or an insulating sphere, such as glass, as a core. The diameter of the electrode spheres 12 may be in the order of 0.5 mm to 10 mm. The distribution density of the electrode spheres 11 in the insulator can be properly selected, according to the desired operating characteristics of the cable.

Even if either an induced voltage or an abnormal surge voltage is applied across the electrodes 7,8, the spplied voltge is dissipated among the electrode spheres due to static capacitances produced between the electrode spheres distributed in the insulator.

Obviously, numerous modifications and variations of the present invention are possible in light of the above teachings. It is therefore to be understood that within the scope of the appended claims, the invention may be practiced otherwise than as specifically described herein.

What is claimed is:

1. A power cable joint structure comprising:

first insulated cable conductor having one end with an exposed conductor;

second insulated cable conductor having one end with an exposed conductor;

connecting means for connecting said exposed conductors of said first and second insulated cable conductors, whereby said first insulated cable conductor and said second insulated cable conductor are rendered electrically conductive with respect to each other and a joint is formed;

cable shielding layer means covering said joint and portions of said first and second insulated cable conductors, and having a pair of electrodes located opposite to each other defining a gap therebetween;

reinforcing insulating means disposed between said joint and said cable shielding layer means; and sheath isolation means, located substantially in said gap, including an insulator with a plurality of electrode spheres disposed therein.

2. A power cable joint structure according to claim 1, wherein said plurality of electrode spheres are made of steel.

3. A power cable joint structure according to claim 1, wherein said plurality of electrode spheres are made of iron.

4. A power cable joint structure according to claim 1, wherein said plurality of electrode spheres are made of copper.

5. A power cable joint structure according to claim 1, wherein said plurality of electrode spheres are made of aluminium.

6. A power cable joint structure according to claim 1, wherein said plurality of electrode spheres are each made of coated semiconductive plastic with a sphere as a core.

7. A power cable joint structure according to claim 6, wherein said core is made of conductive material.

8. A power cable joint structure according to claim 6, wherein said core is made of insulating material.

9. A power cable joint structure according to claim 8, wherein said insulating material is glass.

10. A power cable joint structure according to claim 1, wherein the diameter of said electrode spheres is of the order of 0.5 mm to 10 mm.

* * * * *